United States Patent Office 2,882,043
Patented Apr. 14, 1959

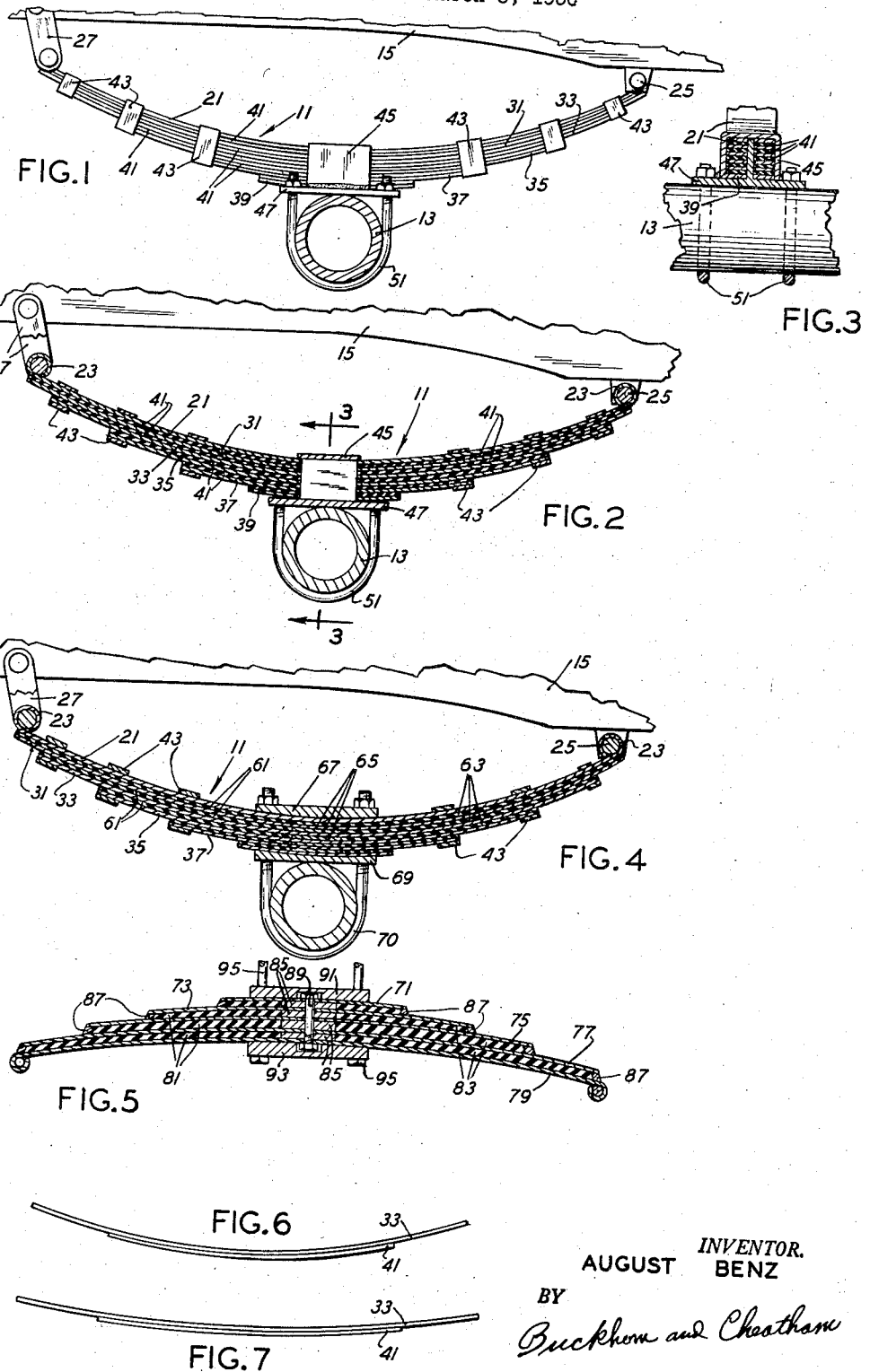

2,882,043

LEAF SPRING WITH PRESTRESSED RUBBER INSERTS

August Benz, Portland, Oreg., assignor to Benz Spring Company, Portland, Oreg., a corporation of Oregon Application March 5, 1956, Serial No. 569,644

7 Claims. (Cl. 267—47)

This invention relates to an automotive spring, and particularly to an automotive spring of the type including a plurality of leaves having layers of elastomer material interleaved therewith and bonded thereto.

Leaf springs of the type under consideration have come into recent widespread use because they operate without noise and do not require oiling or greasing. However, up to the time of the present invention, the rubber or elastomer layers have exerted a substantial snubbing force on the spring, thus making the riding qualities of the automobile not as comfortable as desired.

A main object of the present invention is to provide a leaf spring of the type under consideration which is so constructed that the elastomer layers do not interfere or offer resistance to free flexing of the spring leaves during ordinary loading of the spring, but are effective to offer substantial snubbing resistance to severe shocks imposed on the spring.

Another object of the present invention is to provide a spring of the type just described having a novel mechanism for mounting the spring leaves on an axle and also a novel mechanism for connecting the spring leaves together.

The spring of the present invention is characterized by including a plurality of superposed spring leaves and a plurality of layers of elastomer material arranged in interleaved relation with respect thereto and bonded to the leaves. Each elastomer layer is in a stressed or tensioned condition when the spring assumes an undeformed shape or when the spring is under a minimum load, so that the spring can flex under normal loads without interference by the elastomer layers. Thus the spring has a double stage flexing action.

Various other objects of the present invention will be apparent from the following description taken in connection with the accompanying drawings, wherein:

Fig. 1 is a side elevational view of a spring of the present invention mounted between an axle housing and the chassis or body of an automobile;

Fig. 2 is a longitudinal sectional view through the spring disclosed in Fig. 1, better showing the construction thereof;

Fig. 3 is a cross-sectional view in elevation taken along line 3—3 of Fig. 2, showing the manner of mounting the spring leaves on the axle housing;

Fig. 4 is a view generally similar to Fig. 2, but showing a modified form of the invention;

Fig. 5 is a view somewhat similar to Fig. 4, but showing a still further modified form of the invention; and Figs. 6 and 7 show stages in the method of constructing a spring of the present invention.

Referring to the accompanying drawings, and particularly to Figs. 1, 2 and 3, the spring 11 is shown as being mounted on an axle housing 13 at the central portion thereof and connected at its ends to the body 15 of an automobile. More in detail, the spring 11 includes a top leaf 21 having the ends thereof formed with eyes 23 by which the spring is connected by a pivot bolt 25 and a shackle 27, of conventional construction, to the body of the automobile. The spring includes further leaves 31, 33, 35, 37 and 39, which are of progressively decreasing lengths, and are disposed so that each lower leaf is arranged generally symmetrically with respect to and within the confines of each upper leaf. Arranged in alternating or interleaved fashion between the leaves are a plurality of layers or inserts 41 of elastomer material, such as rubber, each layer comprising a single strip and being of a length such that it does not project beyond the ends of the adjacent lower leaf. It is pointed out that the upper elastomer layer 41 extends substantially to the bolt 25 and shackle 27 and that the leaf 31 therebelow also extends substantially to these parts. Suitable straps 43 hold the free ends of each lower leaf against the leaf thereabove.

The central portions of the spring leaves extend through a housing including an inverted U-shaped housing element 45 (Fig. 3) which is welded at its lower ends to the upper surface of an inverted T-shaped member 47. The central leg of the member 47 extends upwardly through central longitudinally extending slots formed in the spring leaves and in the elastomer layers. The base of the T-shaped member 47 projects longitudinally beyond the housing element 45 (Fig. 1), and laterally beyond the spring leaves, and the ends of the base receive the ends of a pair of U-bolt fasteners 51 which secure the housing element to the axle housing 13.

The elastomer layers 41 are prestressed or pretensioned an extent such that when the spring is lightly loaded, the elastomer layers are in a tensionally stressed condition longitudinally of the leaves. As the spring is progressively deformed under loads, the elastomer layers return to a neutral condition at an intermediate load condition of the spring. If the spring is loaded still more, such as might occur when the spring is subjected to severe shocks, the elastomer layers are stressed in compression and thus exert a snubbing force resisting further deformation of the spring leaves, thus resisting "bottoming" of the spring and also preventing the severe shocks from being transmitted to the occupants of the automobile. It will be appreciated that the spring operates both as a tension and as a compression shock absorber.

Figs. 6 and 7 show a method by which the elastomer layers may be prestressed. Fig. 7 shows a single leaf, such as leaf 33, as having been deformed to an intermediate load position. An unstressed layer 41 of rubber, or other suitable elastomer material, is then bonded to the underside of this spring leaf and the leaf allowed to return to an unsprung condition as shown in Fig. 6. The increase in the arcuate condition of the spring stretches the layer 41. In actual practice all the leaves and layers may simultaneously be arranged in assembled relation in the condition illustrated in Fig. 7 for the single leaf, and the layers bonded in place, with each layer being bonded to the opposed surfaces of the two adjacent leaves, or merely to one of the adjacent leaves. In the latter construction, the rubber may flow edgewise as a leaf is distorted. The bonding step may be carried out by vulcanizing or by the use of an adhesive.

Fig. 4 shows a modified form of the invention in which two adjacent spring leaves are separated by a layer including a pair of strips 61 and 63 and a central metal spacer plate 65. An upper saddle plate 67 having a convex lower surface and a lower saddle plate 69 having a concave upper surface are clamped against the opposite sides of the spring leaf assembly by a pair of U-bolts 70, one of which is shown. The U-bolts are arranged at the sides of the leaves and extend through both of the saddle plates.

Fig. 5 shows a still further modified form of the invention in which the spring leaves are bowed in the opposite direction from those of the Figs. 1 and 4 forms and are numbered 71, 73, 75, 77 and 79. Each two adjacent spring leaves are separated by a pair of elastomer strips 81 and 83 and by a central metal spacer 85. In this form of the invention there are no straps 43, as there are in the Figs. 1 and 4 forms of the invention, but there is a metal spacer block 87 at each end of each leaf which slidably engages the adjacent leaves. Each block is bonded to the end of the associated elastomer layer. There is also a connecting bolt 89 which extends through suitable apertures in the central portions of the spring leaves and the spacers 85. The ends of the bolt 89 are recessed within the plates. This spring may be connected at its central portion to the body of a vehicle by suitable saddle plates 91 and 93 and bolts 95, and, at its ends, to a vehicle by connecting devices not shown.

The elastomer layers of the various springs may be made of different thicknesses or densities to allow variable resistance to apply to any leaf.

Having described the invention in what is considered to be the preferred embodiment thereof, it is desired that it be understood that the invention is not to be limited other than by the provisions of the following claims.

I claim:

1. An automotive leaf spring comprising a series of superposed spring leaves, layers of an elastomer material arranged in interleaved relation with respect to said spring leaves, at least one of the layers being in a stretched condition and being bonded to one of the opposed surfaces of the two adjacent leaves so that the spring can flex under load without interference by said one elastomer layer until the flexing is sufficient to cause said one elastomer layer to undergo a reversal of stress.

2. An automotive leaf spring comprising a series of superposed spring leaves, layers of an elastomer material arranged in interleaved relation with respect to said spring leaves, at least one of the layers being in a stretched condition and being bonded to the opposed surfaces of the two adjacent leaves so that the spring can flex under load without interference by said one elastomer layer until the flexing is sufficient to cause said one elastomer layer to undergo a reversal of stress.

3. An automotive leaf spring comprising a series of superposed spring leaves, layers of an elastomer material arranged in interleaved relation with respect to said spring leaves, each layer being in a prestressed tensioned condition when said spring is under minimum load and being under compression when said spring is under maximum load and being unstressed when said spring is under an intermediate load so that the spring can flex without interference by the elastomer layers when subjected to a load between minimum and intermediate but will meet snubbing resistance from said elastomer layers when loaded beyond said intermediate load.

4. An automotive leaf spring comprising a series of superposed spring leaves, layers of elastomer material arranged in interleaved relation between said spring leaves, each layer being in a stretched condition and being bonded to the opposed surfaces of the two adjacent leaves so that the spring can flex under load without interference by the elastomer layers until the flexing is sufficient to cause the elastomer layers to undergo a reversal of stress, at least certain pairs of leaves each being separated by a layer which consists of a single strip of elastomer material.

5. An automotive leaf spring comprising a series of superposed spring leaves, layers of elastomer material arranged in interleaved relation between said spring leaves, each layer being in a stretched condition and being bonded to the opposed surfaces of the two adjacent leaves so that the spring can flex under load without interference by the elastomer layers until the flexing is sufficient to cause the elastomer layers to undergo a reversal of stress, at least certain pairs of leaves each being separated by a layer which consists of two strips, and a central metal spacer plate between the inner ends of each two associated strips.

6. An automotive leaf spring comprising a series of superposed spring leaves, layers of elastomer material arranged in interleaved relation between said spring leaves, each layer being in a stretched condition and being bonded to the opposed surfaces of the two adjacent leaves so that the spring can flex under load without interference by the elastomer layers until the flexing is sufficient to cause the elastomer layers to undergo a reversal of stress, said leaves being sandwiched between a pair of saddle plates, and fasteners extending through the saddle plates for mounting the leaves in place, one of said saddle plates having a convex surface next to said leaves and the other saddle plate having a concave surface next to said leaves so that the leaves extend in bowed relation between said saddle plates.

7. An automotive leaf spring comprising a series of superposed spring leaves, layers of elastomer material arranged in interleaved relation between said spring leaves, each layer being in a stretched condition and being bonded to the opposed surfaces of the two adjacent leaves so that the spring can flex under load without interference by the elastomer layers until the flexing is sufficient to cause the elastomer layers to undergo a reversal of stress, at least certain pairs of leaves each being separated by a layer which consists of two elastomer strips, a central metal spacer plate between the inner ends of each two associated strips, said leaves being sandwiched between a pair of saddle plates, fasteners extending through the saddle plates for mounting the leaves in place, and a bolt extending through the leaves and spacer plates and securing them together, one of said saddle plates having a convex surface next to said leaves and the other saddle plate having a concave surface next to said leaves so that the leaves extend in bowed relation between said saddle plates.

References Cited in the file of this patent

UNITED STATES PATENTS

| | | |
|---|---|---|
| 901,162 | Fay et al. | Oct. 13, 1908 |
| 1,018,250 | McIntyre | Feb. 20, 1912 |
| 1,314,817 | Laycock | Sept. 2, 1919 |
| 1,443,545 | Lord | Jan. 30, 1920 |
| 1,523,376 | Beran | Jan. 13, 1925 |
| 2,223,741 | Rabe | Dec. 3, 1940 |
| 2,299,873 | Beckel | Oct. 27, 1942 |
| 2,559,105 | Banning | July 3, 1951 |